Oct. 13, 1942.    J. L. McCLINTOCK    2,298,799
KEYBOARD COVER
Filed Aug. 5, 1941
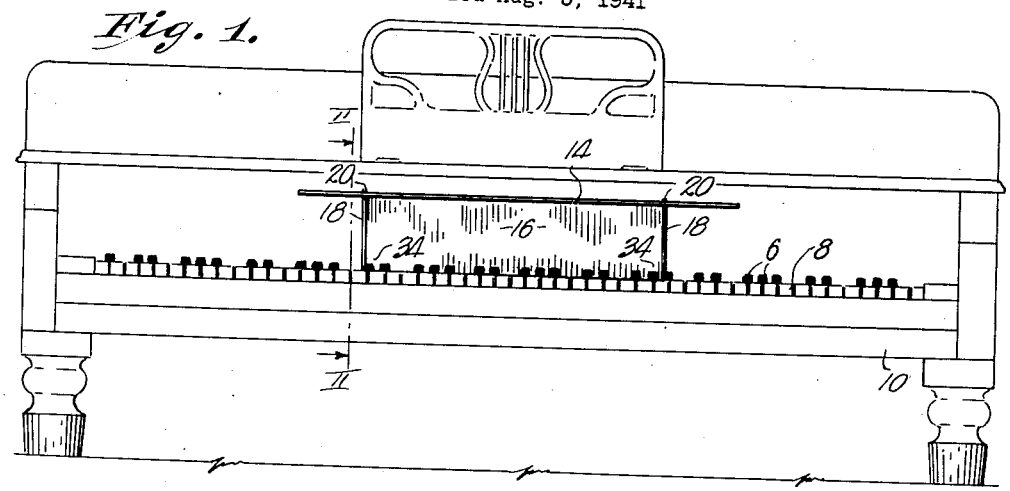
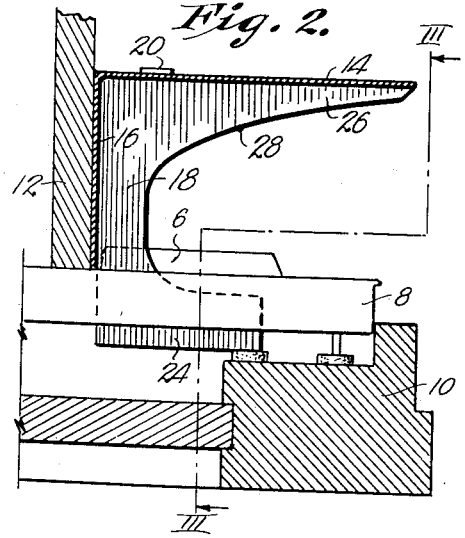
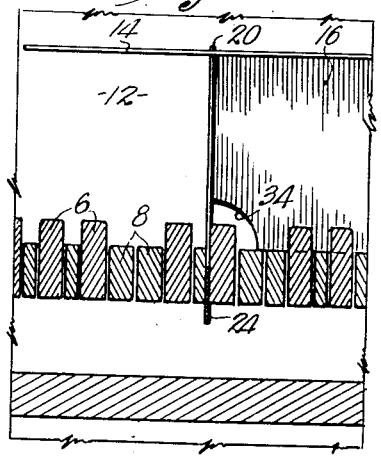
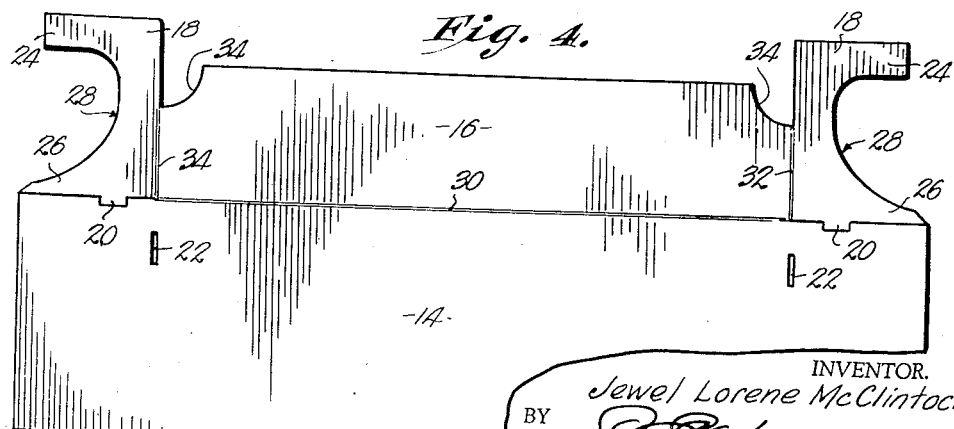
INVENTOR.
Jewel Lorene McClintock
BY 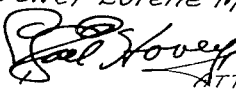
ATTORNEY.

Patented Oct. 13, 1942

2,298,799

UNITED STATES PATENT OFFICE 2,298,799

KEYBOARD COVER

Jewel Lorene McClintock, Slaton, Tex.

Application August 5, 1941, Serial No. 405,529

7 Claims. (Cl. 84—467)

This invention relates to attachments for musical instruments and particularly, those having keyboards that are manipulated by the fingers of the player, and the primary object is the provision of a simple, effective, economical and easily attachable keyboard cover that will interrupt the normal line of vision of the piano student, for example, to eliminate entirely the sense of sight, so far as its relation to the position of the fingers and keys of the board is concerned.

It has long been known that those starting to learn the use of the piano should not be permitted to watch the keyboard and position of the hands and fingers thereon through the employment of sight. The so-called "touch system" is preferable, but since the teacher or the student himself may not wish to manipulate the piano keyboard with a cover thereon at all times, it is desirable to provide a cover which will be easily attached, will not mar or deface any part of the piano itself, and may be collapsed to a flat condition where it may be stored without occupying much space.

The keyboard cover made in acordance with this invention, therefore, embodies concepts meeting the requirements of those desiring to practice or teach the touch system.

The preferred embodiment of the invention likewise meets the problem of providing an inexpensive, easily attachable, efficient and quickly collapsible cover, having means for attachment that will in nowise be objectionable.

Details of construction are important so far as the present invention is concerned, and such details constitute minor objects, all of which will appear during the course of the following specification, referring to the accompanying drawing wherein:

Fig. 1 is a front elevational view of a keyboard cover showing the same in operative position.

Fig. 2 is a vertical sectional view, taken on line II—II of Fig. 1.

Fig. 3 is a sectional view taken on line III—III of Fig. 2; and

Fig. 4 is a stretch-out plan view of the cover showing the same in the condition before folding.

The conventional piano with which the keyboard cover is used comprises black and white keys 6 and 8 respectively, that are movable vertically toward and from an underlying structure 10, and between which spaces are created that are wide enough to receive the hereinafter described brackets of the cover.

The backboard 12 of the piano extends vertically from above keys 6 and 8, and likewise constitutes a part of the piano that is engaged by hereinafter mentioned portions of the board of the keyboard cover.

In its preferred form the cover is made of fiber board, cut and scored to provide a panel 14, a wall 16, a pair of brackets 18, and means including an ear and slot 20 and 22 for interlocking brackets 18 and panel 14, when the device is ready for use.

Each bracket 18 has a foot 24 and an overhanging portion 26 between which a notch 28 is provided to lend clearance to the hands and fingers of the piano player.

A line of score 30 forms a hinge between panel 14 and wall 16 and lines of score 32 establish similar lines of connection between brackets 18 and wall 16.

Notches 34 formed in the lower longitudinal edge of wall 16 at its zone of connection with brackets 18, provide clearance for a black key when the cover is in place, as illustrated in Figs. 1 and 3.

Fig. 4 illustrates the cover as blanked and ready for forming.

When the cover is to be stored by the user, line of hinge 30 permits superimposing panel 14 upon wall 16 and brackets 24 to present a completely flat device. When the cover is in place, panel 14 overhangs the keys 6 and 8 therebeneath. Feet 24 of brackets 18 extend to a position shown in Fig. 2, where they rest upon underlying structure 10 while wall 16 bears against backboard 12. Notches 28 afford ample clearance for the hands and fingers of the player, and the line of vision is interrupted by panel 14.

Ears 20 enter openings 22 to maintain brackets 18 in vertical planes, perpendicular to the horizontal normal plane of panel 14.

The simplicity of construction, ease of attachment, economy of manufacture and efficiency of results, are clear to one skilled in the art, and while the preferred embodiment of the invention has been illustrated and described, it is desired to be limited only by the scope of the appended claims.

Having thus described the invention, what is claimed as new and desired to be secured by Letters Patent is:

1. A piano keyboard cover comprising a unitary, collapsible body having a panel; and a plurality of brackets hingedly secured to the panel, said brackets being formed and disposed to enter spaces between the keys of the piano and when in such position, to support the panel above the keys in parallel spaced relation thereto.

2. A piano keyboard cover comprising a unitary, collapsible body having a panel; and a plurality of brackets hingedly secured to the panel, said brackets being formed and disposed to enter spaces between the keys of the piano and when in such position to support the panel above the keys in parallel spaced relation thereto, said brackets being notched to provide clearance for the hands of the piano player.

3. A piano keyboard cover comprising a unitary, collapsible body formed of fiber board having a panel; a plurality of brackets underlying the panel; and a wall hingedly connected to the brackets and to the panel along one longitudinal edge thereof, said brackets being in planes transverse to the plane of said panel and having notches formed inwardly from the edges thereof to provide clearance for the hands of the piano player.

4. A piano keyboard cover comprising a unitary collapsible body formed of fiber board, said body comprising a panel; a wall extending along one longitudinal edge of the panel, hingedly secured to said edge, depending therefrom, and having the ends spaced inwardly from the ends of said panel; and a bracket at each end of the wall, said brackets being hingedly attached to the ends of the wall and extending laterally therefrom beneath the panel to support the same above and in parallel relation to the keyboard of the piano, said brackets each having an overhanging portion directly beneath the panel and providing a space between the overhanging portion and the keys of the piano.

5. A piano keyboard cover comprising a unitary, collapsible body formed of fiber board, said body comprising a panel; a wall extending along one longitudinal edge of the panel, hingedly secured to said edge, depending therefrom, and having its ends spaced inwardly from the ends of said panel; and a bracket at each end of the wall, said brackets being hingedly attached to the ends of the wall and extending laterally therefrom beneath the panel to support the same above and in parallel relation to the keyboard of the piano, said brackets each having an overhanging portion directly beneath the panel and a foot below the overhanging portion to enter between the keys of the piano.

6. A piano keyboard cover comprising a unitary, collapsible body formed of fiber board, said body comprising a panel; a wall extending along one longitudinal edge of the panel, hingedly secured to said edge, depending therefrom, and having its ends spaced inwardly from the ends of said panel; and a bracket at each end of the wall, said brackets being hingedly attached to the ends of the wall and extending laterally therefrom beneath the panel to support the same above and in parallel relation to the keyboard of the piano, said brackets each having an overhanging portion directly beneath the panel and a foot below the overhanging portion to enter between the keys of the piano, said brackets each being cut away between the overhanging portion and the foot to provide clearance for the hands of the piano player.

7. A piano keyboard cover comprising a unitary, collapsible body formed of fiber board, said body comprising a panel; a wall extending along one longitudinal edge of the panel, hingedly secured to said edge, depending therefrom, and having its ends spaced inwardly from the ends of said panel; and a bracket at each end of the wall, said brackets being hingedly attached to the ends of the wall and extending laterally therefrom beneath the panel to support the same above and in parallel relation to the keyboard of the piano, said brackets each having an overhanging portion directly beneath the panel and a foot below the overhanging portion to enter between the keys of the piano, said wall having notches at the lower edge thereof and at lines of connection with brackets.

JEWEL LORENE McCLINTOCK.